United States Patent
Rudge et al.

(10) Patent No.: US 10,400,777 B2
(45) Date of Patent: Sep. 3, 2019

(54) PUMP LUBRICANT SUPPLY SYSTEMS

(71) Applicant: Edwards Limited, Burgess Hill, West Sussex (GB)

(72) Inventors: Oliver James Rudge, Burgess Hill (GB); Emiliano Lucchetta, Burgess Hill (GB)

(73) Assignee: Edwards Limited, Burgess Hill, West Sussex (GB)

( * ) Notice: Subject to any disclaimer, the term of this patent is extended or adjusted under 35 U.S.C. 154(b) by 203 days.

(21) Appl. No.: 15/546,935

(22) PCT Filed: Jan. 21, 2016

(86) PCT No.: PCT/GB2016/050131
§ 371 (c)(1),
(2) Date: Jul. 27, 2017

(87) PCT Pub. No.: WO2016/128712
PCT Pub. Date: Aug. 18, 2016

(65) Prior Publication Data
US 2018/0030990 A1    Feb. 1, 2018

(30) Foreign Application Priority Data
Feb. 9, 2015    (GB) .................................... 1502106

(51) Int. Cl.
*F16C 3/02* (2006.01)
*F16N 7/36* (2006.01)
(Continued)

(52) U.S. Cl.
CPC .......... *F04D 29/063* (2013.01); *F04D 19/042* (2013.01); *F04D 29/059* (2013.01);
(Continued)

(58) Field of Classification Search
CPC ... F16N 7/12; F16N 7/40; B60R 17/02; F04D 29/059; B61K 3/00
(Continued)

(56) References Cited

U.S. PATENT DOCUMENTS 1,664,671 A    4/1928   Eisengart

FOREIGN PATENT DOCUMENTS

| CN | 1959117 A | 5/2007 |
|---|---|---|
| CN | 103629146 A | 3/2014 |

(Continued)

OTHER PUBLICATIONS

First Office Action dated Nov. 27, 2018 and Search Report dated Nov. 19, 2018 for Chinese Application No. 201680020943.8.
(Continued)

*Primary Examiner* — Henry Y Liu
(74) *Attorney, Agent, or Firm* — Westman, Champlin & Koehler, P.A.; Theodore M. Magee (57) ABSTRACT

A pump lubricant supply system has a lubricant reservoir and at least one contactor to engage a lubricant transfer device provided on a rotor shaft of a pump to transfer lubricant from the lubricant reservoir to the lubricant transfer device via the at least one contactor. The lubricant reservoir includes at least a first reservoir portion formed of a first elongate strip of porous material wound to define a first lubricant container body having a longitudinal axis that extends transverse to the longitudinal axis of the elongate strip.

38 Claims, 9 Drawing Sheets

(51) Int. Cl.
*F04D 19/04* (2006.01)
*F16C 19/06* (2006.01)
*F16C 27/04* (2006.01)
*F16C 33/66* (2006.01)
*F04D 29/053* (2006.01)
*F04D 29/059* (2006.01)
*F04D 29/063* (2006.01)

(52) U.S. Cl.
CPC ............... *F16C 3/02* (2013.01); *F16C 19/06* (2013.01); *F16C 27/045* (2013.01); *F16C 33/6648* (2013.01); *F16C 33/6666* (2013.01); *F16C 33/6685* (2013.01); *F16N 7/36* (2013.01); *F16N 7/366* (2013.01); *F04D 29/053* (2013.01); *F16C 2300/34* (2013.01); *F16C 2360/45* (2013.01)

(58) Field of Classification Search
USPC ..................................................... 184/6, 6.28
See application file for complete search history.

(56) References Cited

FOREIGN PATENT DOCUMENTS

| | | |
|---|---|---|
| CN | 104214112 A | 12/2014 |
| CN | 104251203 A | 12/2014 |
| EP | 2390510 A2 | 11/2011 |
| EP | 2600005 A1 | 6/2013 |
| EP | 2728195 A2 | 5/2014 |
| EP | 2816235 A1 | 12/2014 |
| GB | 1331166 | 9/1973 |
| SU | 1359491 A1 | 12/1987 |
| WO | 2006131694 A1 | 12/2006 |
| WO | 2014174273 A1 | 10/2014 |

OTHER PUBLICATIONS

British Search Report dated Jul. 16, 2015 for corresponding British Application No. GB1502106.6.
PCT International Search Report and Written Opinion dated Mar. 29, 2016 for corresponding PCT Application No. PCT/GB2016/050131.

FIG 16

PUMP LUBRICANT SUPPLY SYSTEMS

CROSS REFERENCE OF RELATED APPLICATION

This Application is a Section 371 National Stage Application of International Application No. PCT/GB2016/050131, filed Jan. 21, 2016, which is incorporated by reference in its entirety and published as WO 2016/128712 A1 on Aug. 18, 2016 and which claims priority of British Application No. 1502106.6, filed Feb. 9, 2015.

FIELD

The invention relates to pump lubricant supply systems to lubricate pump bearings and particularly, but not exclusively, to vacuum pump lubricant supply systems to lubricate a rolling bearing of a vacuum pump.

BACKGROUND

Many pumps comprise an impeller in the form of a rotor mounted on a rotor shaft for rotation relative to a surrounding stator. The rotor shaft is supported by a bearing arrangement that may comprise two bearings located at or intermediate respective ends of the shaft. One or both of these bearings may be a rolling hearing. The upper bearing may be in the form of a magnetic bearing and the lower bearing is a rolling bearing. This arrangement may be used in vacuum pumps such as, for example, turbomolecular vacuum pumps.

A typical rolling bearing comprises an inner race fixed relative to the rotor shaft, an outer race and a plurality of rolling elements located between the races for allowing relative rotation of the inner race and the outer race. To prevent mutual contact between the rolling elements they are often guided and evenly spaced by a cage. Adequate lubrication is essential to ensure accurate and reliable operation of rolling bearings. The main purpose of the lubricant is to establish a load-carrying film separating the bearing components in rolling and sliding contact in order to minimise friction and wear. Other purposes include the prevention of oxidation or corrosion of the bearing components, the formation of a barrier to contaminants and the transfer of heat away from the bearing components. The lubricant is generally in the form of either oil or grease (a mixture of oil and a thickening agent).

Pumps using oil-lubricated bearings require an oil feed system to feed oil between the contact areas of the bearing, which enables the oil to perform cooling as well as lubrication and thereby permit the bearings to run at a faster speed. Turbomolecular vacuum pumps have traditionally used a wicking system for supplying oil to a rolling bearing. In such a system, a felt wick supplied by an oil reservoir feeds oil to a conical "oil feed" nut mounted on the shaft. When the shaft rotates, oil travels along the conical surface of the nut to the bearing. The oil then passes through the bearing and is returned to the reservoir.

The oil reservoir from which the felt wick is supplied may comprise two stacks of layers of felt that lay against respective major surfaces of the felt wick so that the felt wick is sandwiched between the two stacks.

The feed rate of oil to the bearing may be affected by a number of factors, including the taper angle of the conical nut, the rate of transfer of oil from the wick to the nut, the surface finish of the conical surface of the nut, temperature and the speed of rotation of the shaft.

The discussion above is merely provided for general background information and is not intended to be used as an aid in determining the scope of the claimed subject matter. The claimed subject matter is not limited to implementations that solve any or all disadvantages noted in the background.

SUMMARY

The invention provides a pump as specified in claim 1.
The invention also provides a pump lubricant supply system as specified in claim 13.
The invention also provides a method of manufacturing a pump lubricant supply system as specified in claim 26.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure, reference will be made to the drawings, in which.

DETAILED DESCRIPTION

Figure 1:
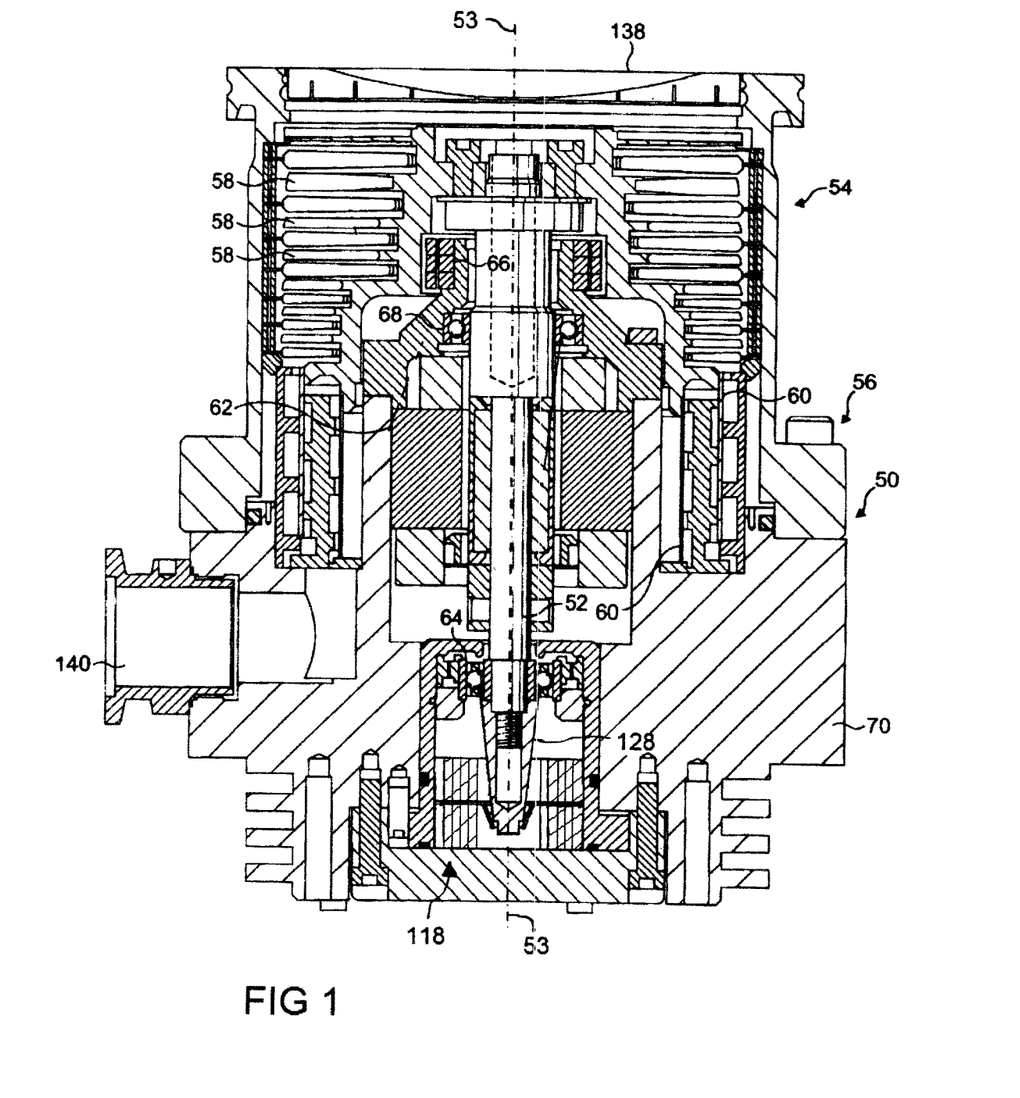
FIG. 1 is a cross-section view of a vacuum pump.

FIG. 1 is a cross-section view of an example of a pump 50. The pump 50 comprises a pumping arrangement driven by a rotor shaft 52 that has a longitudinal axis 53. The rotor shaft 52 is driven to rotate about the longitudinal axis 53 by a motor 62. In this example the pump 50 is a turbomolecular vacuum pump comprising a pumping arrangement in the form of a turbomolecular pumping mechanism 54 and a molecular drag pumping mechanism 56. The turbomolecular pumping mechanism 54 comprises a plurality of rotor blades 58 mounted on, or integral with, the rotor shaft 52. The molecular drag pumping mechanism 56 is in the form of a Holweck pumping mechanism and comprises one or more cylinders 60 mounted on the rotor shaft 52. The molecular drag pumping mechanism may alternatively comprise a Siegbahn mechanism comprising rotating discs. There may be additional, or alternative, mechanisms such as an aerodynamic pumping mechanism downstream of the molecular drag pumping mechanism comprising a regenerative mechanism.

The rotor shaft 52 is supported by a bearing arrangement comprising two bearings 64, 66. The bearings 64, 66 may be positioned at, or adjacent, respective ends of the shaft 52 as shown, or alternatively, intermediate the ends. In the example illustrated by FIG. 1, a rolling bearing 64 supports a first end portion of the rotor shaft 52 and a magnetic bearing 66 supports a second end portion of the rotor shaft 52. A second rolling bearing may be used as an alternative to the magnetic bearing 66. When a magnetic bearing is used, a hack-up rolling bearing 68 may optionally be provided.

Figure 2:
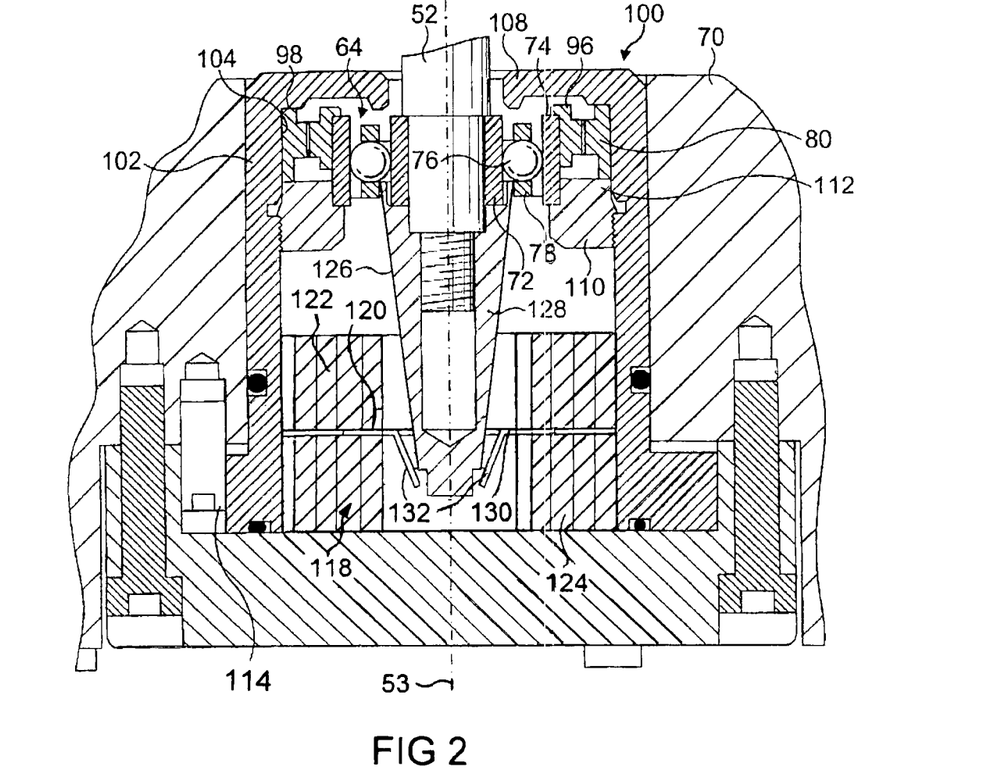
FIG. 2 is an enlargement of the lower end portion of the view shown in FIG. 1.

As best seen in FIG. 2, the rolling bearing 64 is provided between the first end portion of the rotor shaft 52 and a housing portion 70 of the vacuum pump 50. The rolling bearing 64 comprises an inner race 72 fixed relative to the rotor shaft 52, an outer race 74, a plurality of rolling elements 76 and a cage 78 that is configured to provide a desired spacing between the rolling elements. The rolling bearing 64 is configured to allow relative rotation of the inner and outer races 72, 74. The rolling bearing 64 is supplied with a lubricant to establish a load-carrying film that separates the rolling elements 76 from the inner and outer races 72, 74 to minimise friction and wear. The lubricant may be an oil.

Figure 3:
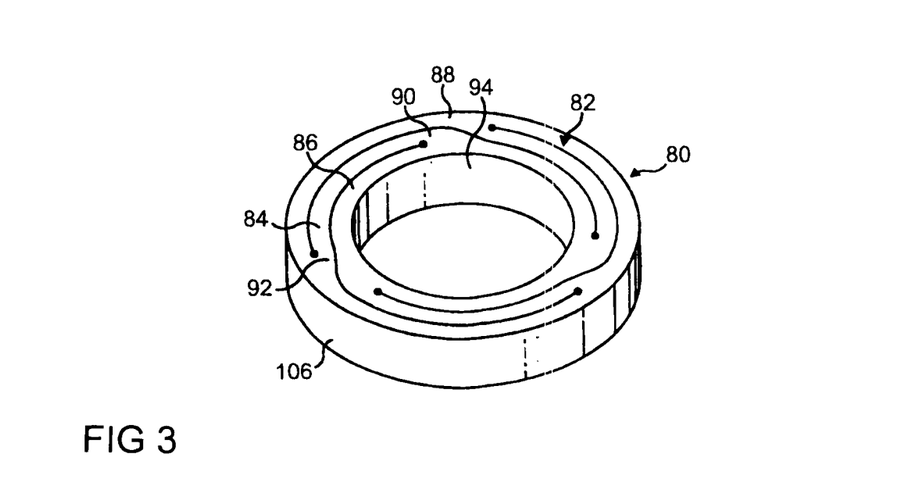
FIG. 3 is a perspective view of a resilient support of the vacuum pump of FIG. 1.

Optionally, a resilient support 80 is provided for supporting the rolling bearing 64 in radial and axial directions relative to the housing portion 70. The resilient support 80 is configured to damp vibrations of the rotor shaft 52 and rolling bearing 64 during use of the vacuum pump 50. As best seen in FIG. 3, the resilient support 80 comprises a plurality of arcuate slots 82 that define a plurality of integral flexible members 84. Each flexible member 84 is located between an inner annular portion 86 and an outer annular portion 88 of the resilient support 80. Each flexible member 84 is connected to the inner annular portion 86 by a first resilient hinge 90 and to the outer annular portion 88 by a second resilient hinge 92.

Figure 4:
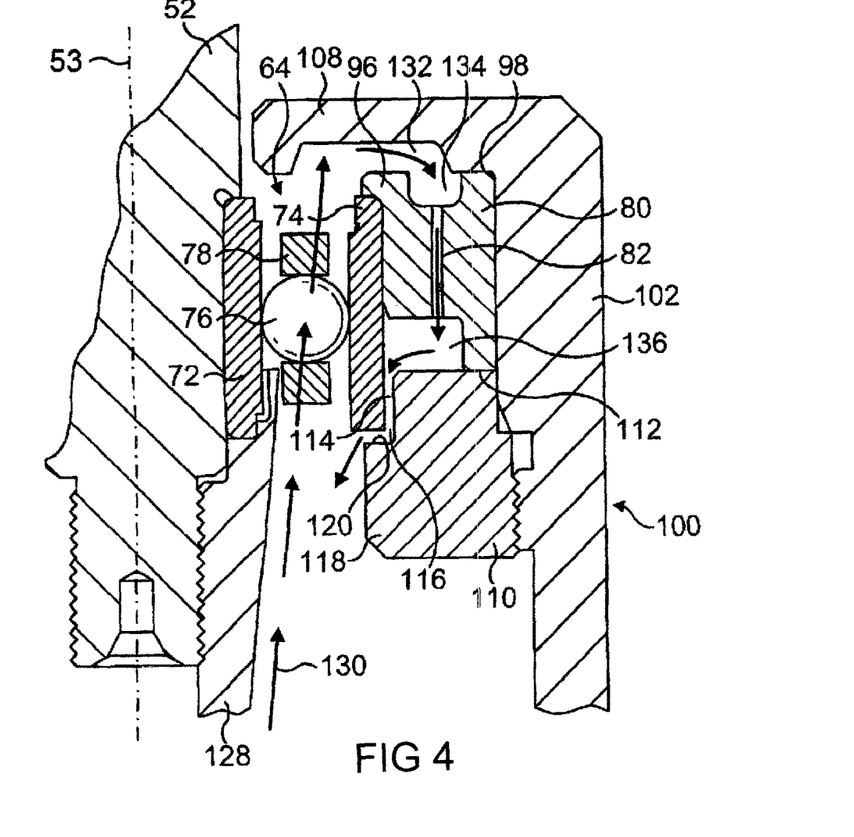
FIG. 4 illustrates in detail the supply of lubricant to a rolling bearing that is shown in FIG. 2.

Referring to FIGS. 2 to 4, a cartridge 100 is provided for retaining the rolling bearing 64 and the resilient support 80 relative to the housing portion 70. The cartridge 100 has an axially extending wall 102 having an inner surface 104 that is in engagement with an outer, axially extending cylindrical surface 106 of the outer annular portion 88 of the resilient support 80. The cartridge 100 also has a radially inwardly extending wall 108 that has a lower (as illustrated) surface engaging the upper end surface 98 (FIG. 2) of the resilient support 80. A bearing nut 110 is attached to the inner surface 104 of the cartridge 100 by means of mutually-engaging screw threads such that an upper (as illustrated) end surface of the bearing nut 110 engages the lower end surface 112 of the resilient support 80 to retain the resilient support 80 within the cartridge 100 and, preferably, to axially pre-load the resilient support 80. The cartridge 100 is attached to the housing portion 70 by means of bolts 114 to secure the resilient support 80 relative to the housing portion 70.

As best seen in FIG. 2, the vacuum pump 50 is provided with a lubricant supply system 118 that comprises a wicking element 120 for supplying lubricant from a lubricant reservoir 122, 124 to a lubricant transfer device 126, 128 provided on the rotor shaft 52. In the illustrated example, the lubricant transfer device comprises a tapered surface 126 of a conical lubricant feed nut 128. The feed nut 128 is located on the end of the rotor shaft 52 adjacent the rolling bearing 64. The end of the feed nut 128 located closest to the rolling bearing 64 has an external diameter selected so that lubricant is delivered to a desired location in the rolling bearing. The external diameter may be approximately equal to the internal diameter of the cage 78.

Referring to FIG. 2, the lubricant reservoir comprises a first reservoir portion comprising a first annular lubricant container body 122 and a second reservoir portion comprising a second annular lubricant container body 124. The wicking element 120 is sandwiched between the two annular lubricant container bodies 122, 124. The wicking element 120 comprises a body portion 130 and at least one contactor in the form of a finger 132 extending from the body portion 130 into engagement with the tapered surface 126. In the illustrated example there are two fingers 132 disposed in opposed spaced apart relation. The body portion 130 of the wicking element 120 receives lubricant from the first and second annular lubricant container bodies 122, 124 and transfers the received lubricant to the tapered surface 126 of the feed nut 128 via the fingers 132.

Referring to FIGS. 2 to 4, when the rotor shaft 52 rotates, lubricant received from the first and second annular lubricant container bodies 122, 124 travels through the wicking element 120 onto the tapered surface 126 of the feed nut 128, which acts like a centrifugal pump. As indicated by the arrows A in FIG. 4, the lubricant travels along the feed nut 128 and into the lower (as illustrated) end of the rolling bearing 64. The lubricant is subsequently discharged from the upper end of the rolling bearing 64. An annular groove 134 is formed in the radially extending wall 108 of the cartridge 100 opposite the upper end of the rolling bearing 64 for deflecting lubricant discharged from the rolling hearing towards the resilient support 80. An annular groove 136 is formed in the upper end surface 98 of the resilient support 80 opposite the annular groove 134. The annular groove 136 defines a reservoir for receiving deflected lubricant from the annular groove 134. Lubricant received in the annular groove 136 feeds into the slots 82 under the influence of gravity. The lubricant in the slots 82 generates load-bearing damping films adjacent the inner and outer circumferential surfaces of the integral flexible members 84. If the rotor shaft 52 vibrates, the damping films are compressed thereby generating hydrodynamic pressure. The presence of lubricant maintained under pressure within the slots 82 has the effect of damping the vibrations, thereby attenuating the transfer of the vibrations to the housing portion 70 of the vacuum pump 50. Lubricant exiting the rolling bearing 64 and resilient support 80 is able to flow back to the first annular lubricant container body 122. The returning lubricant migrates through the first annular lubricant container body 122 into the wicking element 120 for subsequent resupply to the tapered surface 126 of the feed nut 128.

The structure of the lubricant supply system 118 will now be described in greater detail with reference to FIGS. 2 and 5 to 7. In this example, since the two annular lubricant container bodies 122, 124 have at least substantially the same configuration, only the first annular lubricant container body 122 will be described in detail. The first annular lubricant container body 122 is defined by an elongate strip comprising a porous material. The elongate strip has opposed lengthways extending edges 140 and opposite ends 142. The ends 142 may extend perpendicular to the edges 140 so that the strip has a rectangular outline and a longitudinal axis that extends between the ends 142 generally parallel to the edges 140. The first annular lubricant container body 122 is formed by winding the elongate strip into a spiral about an axis 146 that extends transverse to the edges 140. The inner periphery of the first annular lubricant container body 122 forms the side wall of a through-hole 148 centred on the axis 146 such that the axis 146 is also the longitudinal axis of the through-hole. The through-hole 148 is configured to receive the lubricant feed nut 128 with clearance so that the tapered surface 126 does not contact the annular lubricant container body 122.

Figure 5:
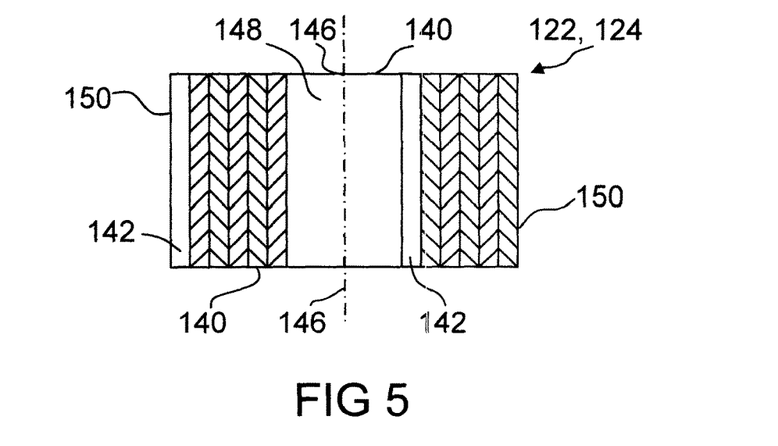
FIG. 5 is a schematic cross-section of a reservoir portion of a lubricant supply system of the vacuum pump of FIGS. 1 to 4.

The first annular lubricant container body 122 has a circumferentially extending outer side wall 150. The first annular lubricant container body 122 is sized such that it has a diameter the same as, or slightly greater than, the diameter of the inner surface 104 of the cartridge 100 so that the annular lubricant container body can be centered with respect to the feed nut 128 by engaging the outer side wall 150 with the inner surface 104 thereby aligning the longitudinal axis 146 of the through-hole 148 with the longitudinal axis 53.

Figure 6:
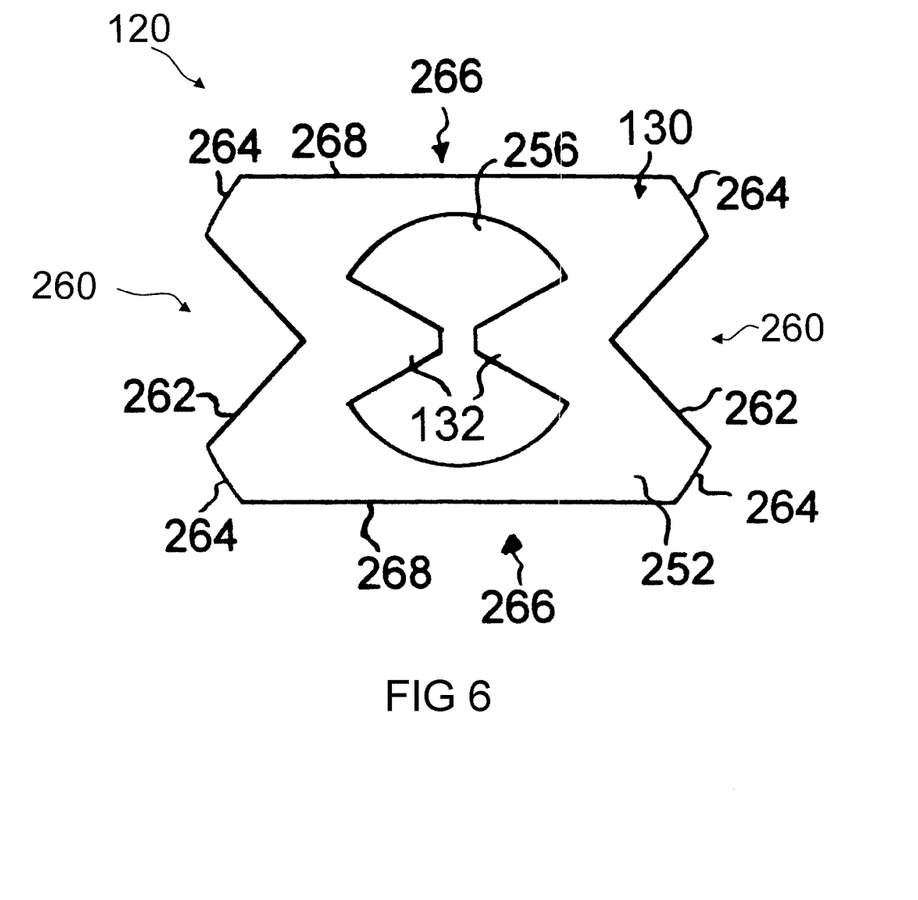
FIG. 6 is a plan view of a wicking element of the lubricant supply system.
Figure 7:
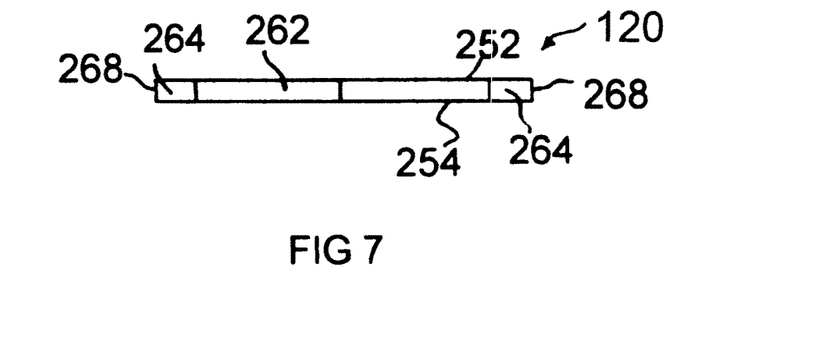
FIG. 7 shows an end elevation of the wicking element of FIG. 6.

Referring to FIGS. 6 and 7, the body portion 130 of the wicking element 120 comprises a generally planar member that has oppositely disposed major surfaces 252, 254. The body portion 130 has a centrally disposed aperture 256 through which the feed nut 128 extends. The aperture 256 defines an inner periphery of the body portion and is configured to define the two fingers 132. The two fingers 132 extend from the inner periphery of the aperture 256 towards its centre. The fingers 132 are configured to engage the tapered surface 126 of the feed nut 128. The fingers 132 may be configured to bend out of the plane of the body portion 130 when engaging tapered surface 126. In the illustrated example there are two fingers 132 disposed in opposed spaced apart relation. In other examples there may be just one finger or more than two fingers as required. In still further examples, there may be two fingers 132 that are laterally offset and configured to extend to a position in line with the longitudinal axis 53 of the rotor shaft 52 so that a side, rather than an end, of each finger engages the tapered surface 126.

The body portion 130 portion has an outer periphery and two cut-outs 260 provided at the outer periphery generally in line with and radially outwardly of the fingers 132. The cut-outs 260 define first portions 262 of the outer periphery that are inclined with respect to, and extend inwardly of, second portions 264 of the outer periphery. The cut-outs 260 may be generally V-shaped as illustrated in FIG. 6. The second portions 264 of the outer periphery are arcs on a diameter corresponding at least substantially to the inside diameter of the annular enclosing wall 202. The configuration of the body portion 250 is such that the outer periphery has sufficient second portions 264 to locate and centre the wicking element 220 with respect to the rotor shaft 52 by engagement with the inner surface 104 of the cartridge 100. Optionally the body portion 250 may have at least one further cut-out 266. The cut-out 266 defines a third portion 268 of the outer periphery. In the illustrated example there are two cut-out portions 266 arranged to define respective third portions 268 of the outer periphery. In this example the third portions 268 comprise two straight edges disposed in parallel spaced apart relation. The pair of cut-outs 266 may be disposed at right angles to the pair of cut-outs 260.

Referring to FIG. 6, it has been found that by providing the wicking element 120 with a suitably configured cut-out, or cut-outs, the flow rate of the lubricant into the fingers 132, and so onto the feed nut 128, can be controlled. This may be due to one, or both of, the reduction in the respective contact areas between the first and second annular lubricant container bodies 122, 124 and the wicking element 210 and the constriction of the lubricant flow paths within the body portion 130. It has also been found that the cut-outs can facilitate the resupply of the second annular lubricant container body 124 with lubricant returned from the rolling bearing 64 via the first annular lubricant container body 122. The cut-outs provide unobstructed lubricant flow paths between the first annular lubricant container body 122 and second annular lubricant container body that allow lubricant to pass from the first annular lubricant container body 122 into the second annular lubricant container body 124 without passing into the wicking element 120. It will be understood that while the use of a wicking element 120 as described with reference to FIGS. 6 and 7 may be advantageous, it is not essential. Instead, for example, a conventional annular disc provided with at least one contactor in the form of a finger extending from its inner periphery to engage the tapered surface 126 of the feed nut 128 may be used.

Figure 8:
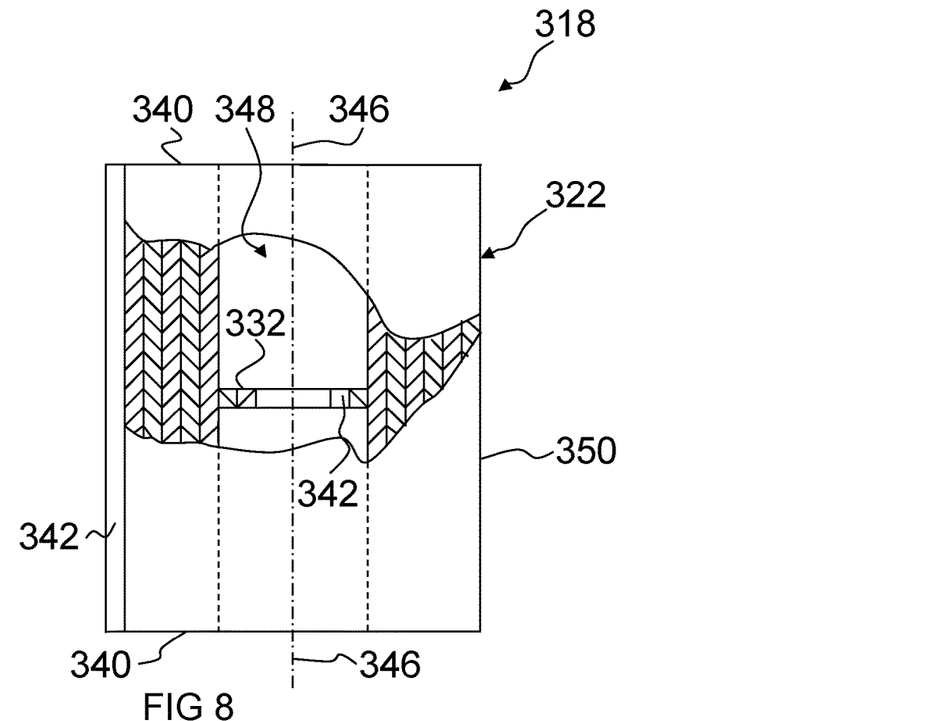
FIG. 8 is a schematic partially sectioned side view of an alternative lubricant supply system that can be used with the vacuum pump of FIG. 1.
Figure 9:
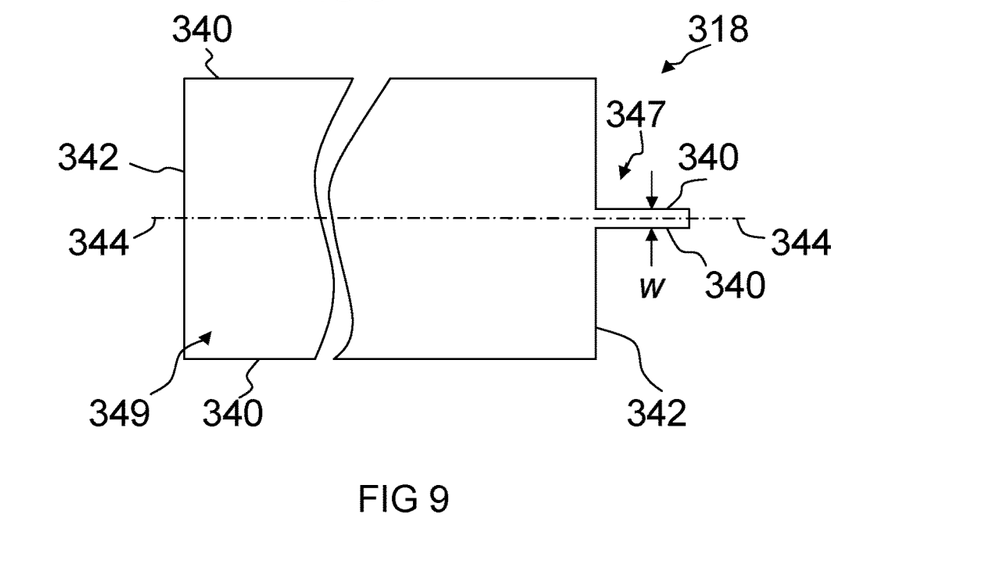
FIG. 9 shows an elongate strip from which the lubricant supply system of FIG. 8 may be formed.

FIGS. 8 and 9 illustrate another lubricant supply system 318, which differs from the previous examples by providing an integral lubricant container body and contactor. The lubricant supply system 318 may be used in the pump 50 shown in FIG. 1 in place of the lubricant system 118. The lubricant supply system 318 comprises a lubricant reservoir comprising an annular lubricant container body 322 and an integral annular contactor 332 configured to engage the tapered surface 126 of the lubricant feed nut 128 to transfer lubricant from the annular lubricant container body to the lubricant feed nut. The annular lubricant container body 322 is defined by an elongate strip comprising a porous material that has opposed lengthways extending edges 340 and opposite ends 342. Although not essential, in the illustrated example the ends 342 extend perpendicular to the lengthways extending edges 340. The elongate strip has a longitudinal axis 344 that extends through the ends 342 and generally parallel to the lengthways extending edges 340. A first end region 347 of the elongate strip has a reduced width w. The annular lubricant container body 322 is formed by winding the elongate strip into a spiral about an axis 346 that extends transverse to the strip axis 344. The inner periphery of the annular lubricant container body 322 forms the side wall of a through-hole 348 centred on the axis 346. Thus, the axis 346 forms the longitudinal axis of the through-hole 348. The annular contactor 332 is defined by the winding of the reduced width w first end region 347 of the elongate strip and the annular lubricant container body 322 is defined by the winding of the relatively wider remainder, or second end region 349, of the strip.

The through-hole 348 is configured to receive the lubricant feed nut 128 with clearance. The annular contactor 332 defines a relatively narrower aperture disposed in the through-hole 348 and configured such that the side wall of the aperture engages the tapered surface 126 of the lubricant feed nut 128 to transfer lubricant from the annular lubricant container body 322 to the lubricant feed nut. By suitable selection of the width w at the first end region 347 of the elongate strip, it is possible to configure the annular contactor 332 with a contact surface area designed to provide a controlled through-put of lubricant onto the tapered surface 126. In the illustrated example, the width w is constant. In other examples, it may be desirable to vary the width to produce an annular contactor that narrows, or tapers, in the radially inwards direction.

The annular lubricant container body 322 has a circumferentially extending outer side wall 350 and is sized such that it has a diameter that is the same as, or slightly larger than, the diameter of the inner surface 104 of the cartridge 100 so that the annular lubricant container body and annular contactor 332 can be centred with respect to the lubricant feed nut 128 by engaging the side wall 350 with the inner surface 104 so that the longitudinal axis 346 of the through-hole 348 is aligned with the longitudinal axis 53.

In the illustrated example the elongate strip is formed such that it is axially symmetric so that when it is wound, the annular lubricant container body 322 and integral annular contactor 332 have a generally symmetric H-shaped cross-section. It is to be understood that this is not essential. For example, instead of using an elongate strip that is axially symmetric as shown in FIG. 9, an axially asymmetric shape may be used with the reduced width first end region located off centre. For example, the reduced width first end region may be located at an edge 340 of the elongate strip so that when the strip is wound, the integral annular contactor is disposed at an end of the through-hole.

Figure 10:
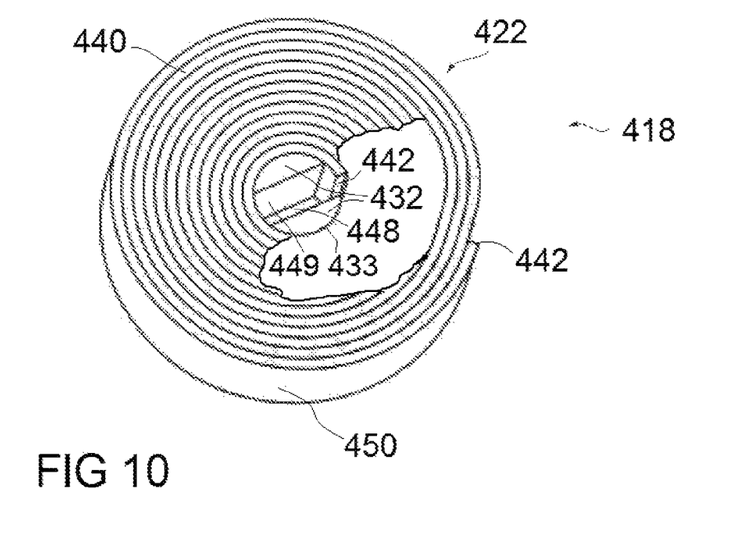
FIG. 10 is a schematic perspective view of another alternative lubricant supply system.

FIG. 10 shows another lubricant supply system 418 that may be used in the pump 50 shown in FIG. 1 in place of the lubricant supply system 118. The lubricant supply system 418 comprises a lubricant reservoir comprising an annular lubricant container body 422 and two contactors 432 configured to engage the tapered surface 126 of the lubricant feed nut 128 to transfer lubricant from the annular lubricant container body to the feed nut. The annular lubricant container body 422 is defined by an elongate strip comprising a porous material. The elongate strip has opposed lengthways extending edges 440 (only one of which is visible in FIG. 10) and opposite ends 442. The elongate strip has a longitudinal axis and is wound into a spiral around an axis that extends perpendicular to the strip axis to form the annular lubricant container body 422. The inner periphery of the annular lubricant container body 422 forms the side wall of a through-hole 448 that is configured to receive the lubricant feed nut 128 with clearance. The annular lubricant container body 422 has a circumferentially extending outer side wall 450 and is sized such that it has a diameter that is the same as, or slightly larger than, the diameter of the inner surface 104 of the cartridge 100 so that the annular lubricant container body can be centred with respect to the lubricant feed nut 128 by engaging the outer side wall 450 with the inner surface 104 so that the longitudinal axis of the through-hole 448 is aligned with the longitudinal axis 53

In this example, there are two contactors in the form of oppositely disposed inserts 432 disposed in the through-hole 448 so as to project from the inner periphery of the annular lubricant container body 422. The inserts 432 and their arched rear faces 433 are configured to mate with the side wall of the through-hole 448 and may be sized so as to be a slight interference fit in the through-hole. The insert 432 bearing against the side of the through-hole 448 adjacent the inner of the two ends 442 of the elongate strip may assist in holding the inner end in place against the adjacent winding of the annular lubricant container body 422. The inserts 432 may be secured to the annular lubricant container body 442 using an adhesive. The adhesive may be a low temperature melting polymer with the adhesive arranged such that it does not interfere with the transfer of from lubricant from the annular lubricant container body 422 into the inserts 432. Alternatively, apertures may be provided in the elongate strip in such a way that when the strip is wound to form the annular lubricant body 422, recesses are defined to receive projections provided on the arched rear faces 433 of the inserts.

In the illustrated example, the inserts 432 have planar contact faces 449 (only one of which is visible in FIG. 10) to engage the tapered surface 126 of the feed nut 128. It will be understood that in other examples the contact faces may be profiled to correspond to one or both of the curvature and taper of the lubricant feed nut 128. In the illustrated example, the contact faces 449 of the inserts 432 have a depth that corresponds to the length of the through-hole 448 or thickness of the annular lubricant container body 422. It will be understood that this is not essential and that as a means of setting the lubricant flow rate to the tapered surface 126 the depth of the contact faces 449 may be reduced as compared with the depth of the annular lubricant container body 422.

Figure 11:
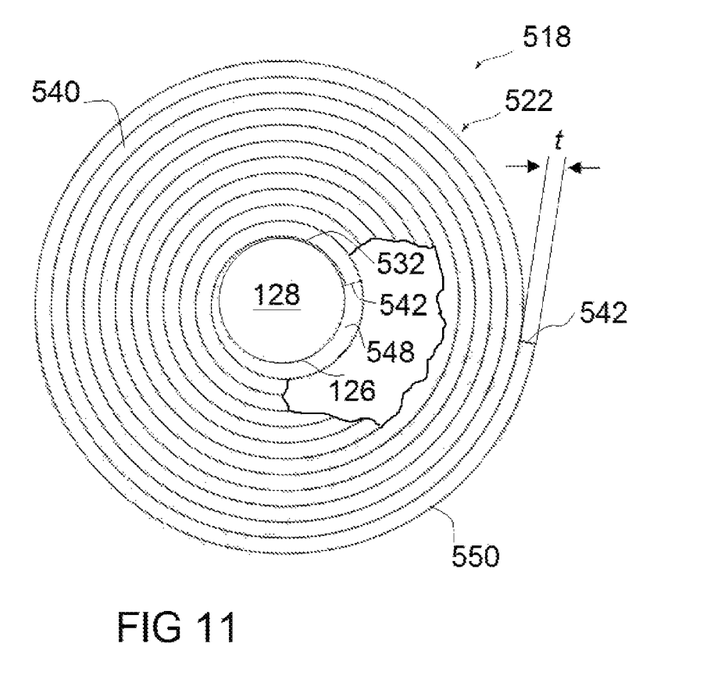
FIG. 11 is a schematic plan view of yet another alternative lubricant supply system.

FIG. 11 shows another lubricant supply system 518 that may be used in the in the pump 50 shown in FIG. 1 in place of the lubricant supply system 118. The lubricant supply system 518 comprises a lubricant reservoir comprising an annular lubricant container body 522 and an integral contact portion 532 configured to engage the tapered surface 126 of the lubricant feed nut 128 to transfer lubricant from the annular lubricant container body to the feed nut. The annular lubricant container body 522 is defined by an elongate strip comprising a porous material. The elongate container body has opposed lengthways extending edges 540 (only one of which is visible in FIG. 11) and opposite ends 542. The elongate strip has a longitudinal axis that extends through the ends 542 and generally parallel to the lengthways extending edges 540. The annular lubricant container body 522 is formed by winding the elongate strip into a spiral about an axis that extends perpendicular to the strip axis. The inner periphery of the annular lubricant container body 522 defines a generally centrally disposed through-hole 548 configured to receive the lubricant feed nut 128. The annular lubricant container body 522 has a circumferentially extending outer side wall 550 and is sized such that it has a diameter that is the same as, or slightly larger than, the diameter of the inner surface 104 of the cartridge 100. Thus, the annular lubricant container body 522 can be centred with respect to the lubricant feed nut 128 by engaging the outer side wall 550 with the inner surface 104 so that the longitudinal axis of the through-hole 548 is aligned with the longitudinal axis 53.

Because the annular lubricant container body 522 is formed by a spiral wound elongate strip that has a substantially constant thickness t, only a part of the arc forming the inner periphery of the annular lubricant container body conforms to the diameter of the lubricant feed nut 128. By suitable selection of the length and thickness t of the elongate strip, a portion of the side wall of the through-hole 548 can be configured to define an integral contactor 532 that provides a desired contact area engaging the tapered surface 126 of the lubricant feed nut 128. In the illustrated example, the integral contactor 332 is disposed at the innermost of the two ends 542 of the elongate strip. In the illustrated example, the end 542 of the elongate strip that forms the innermost end of the spiral is perpendicular to the opposed lengthways extending ends 540 of the elongate strip. In other examples, it may be desirable to shape the end of the elongate strip that forms the innermost end of the spiral to provide an integral contactor 532 with a reduced contact area for engaging the tapered surface 126.

Figure 12:
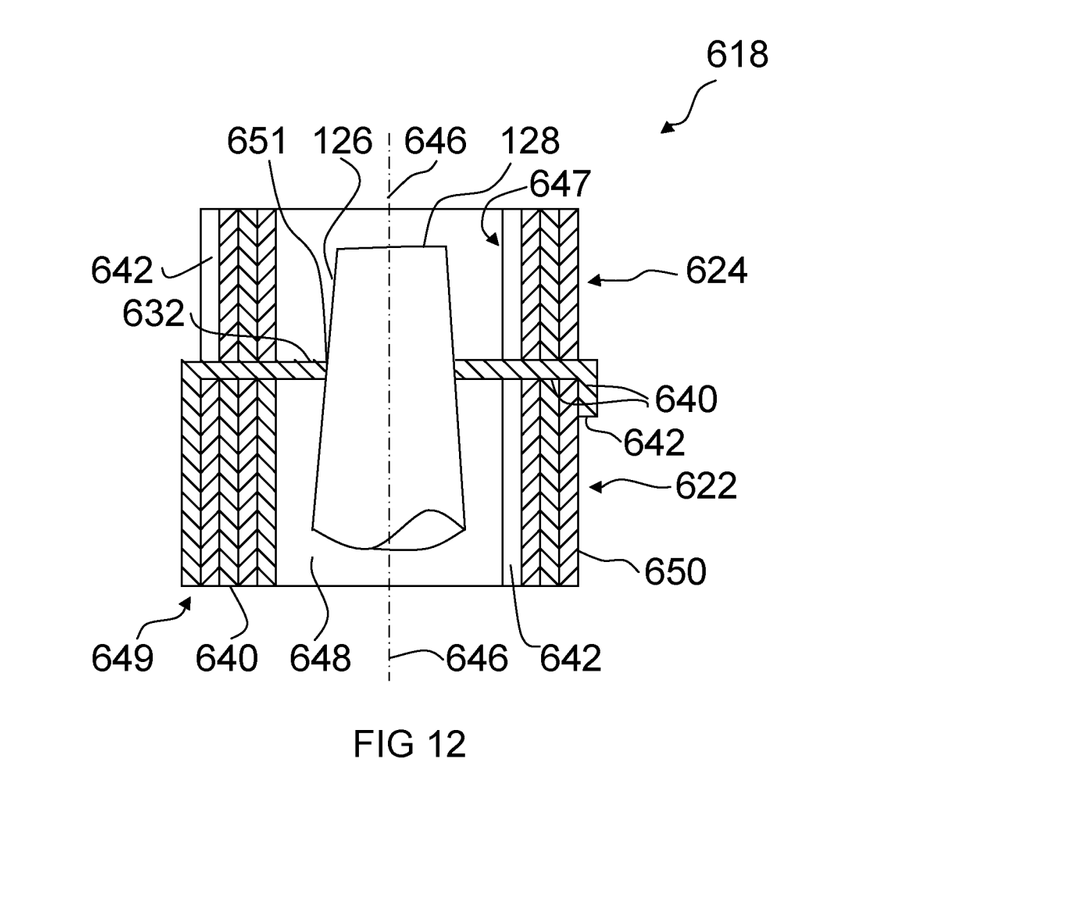
FIG. 12 is a schematic sectioned side view of still another alternative lubricant supply system.

FIG. 12 shows another lubricant supply system 618 that may be used in the pump 50 instead of the lubricant supply system 118. However, in FIG. 12 the lubricant supply system 618 is shown in an arrangement configured to supply lubricant to the tapered surface 126 of a lubricant transfer nut 128 provided on an end of a rotor shaft of an inverted pump (ie as viewed in FIG. 1, a pump in which the lubricant transfer device and the rolling bearing it is to lubricate are provided at the upper end of the rotor shaft). In the example shown in FIG. 12, the rolling bearing (not shown) that is to be lubricated would be disposed adjacent and below (as viewed in the drawings) the lubricant feed nut 128.

The lubricant supply system 618 comprises a lubricant reservoir 622, 624 and a contactor 632 configured to supply lubricant from the lubricant reservoir to the tapered surface 126 of the lubricant feed device 128. The lubricant reservoir comprises a first reservoir portion comprising a first annular lubricant container body 622 and a second reservoir portion comprising a second lubricant container body 624. The annular lubricant container bodies 622, 624 are disposed opposite one another with the contactor 632 sandwiched between them. The contactor 632 is integral with the first annular lubricant container body 622.

The first annular lubricant container body 622 is defined by an elongate strip comprising a porous material. The elongate strip has opposed lengthways extending edges 640 and opposite ends 642. The ends 642 may extend perpendicular to the edges 640 so that prior to being wound to form the first annular lubricant container body 622, the strip has a rectangular outline and a longitudinal axis that extends between the ends 642 generally parallel to the edges 640. The first annular lubricant container body 622 is formed by winding the elongate strip into a spiral about an axis 646 that extends transverse to the edges 640. The inner periphery of the first annular lubricant container body 622 forms a side wall of a through-hole 648 centred on the axis 646 such that the axis forms a longitudinal axis of the through-hole. The through-hole 648 is configured to receive the lubricant feed nut 128 with clearance. The annular lubricant container body has a circumferentially extending outer side wall 650. The annular lubricant container body 622 is sized such that it has a diameter the same as, or slightly greater than, the diameter of the inner surface 104 of the cartridge 100 so that by engaging the outer side wall 650 with the inner surface 104, the first annular lubricant container body 622 can be centred with respect to the feed nut 128 with the longitudinal axis 646 of the through-hole 648 aligned with the longitudinal axis 53.

A second end region 649 of the elongate strip is folded across the outer side wall 650 and over an end of the first annular lubricant body 622 to form the integral contact or 632. The free end of the second end region 649 may be folded against the side wall 650 of the annular lubricant body 622 and secured in place by means of a suitable adhesive. Alternatively, the free end 642 of the second end region 649 may rest against the end of the annular lubricant container body 622. An aperture 651 is provided in the second end region 649 of the elongate strip. The aperture 651 is provided at a position spaced from the free end 642 of the second end region 649 such that its centre is aligned with the longitudinal axis 646 when the second end region is folded over to form the integral contactor 632. Thus, when the first annular lubricant container body 622 is fitted into the pump 50, the aperture 651 of the integral contactor 632 provides an annular contact surface engaging the tapered surface 126 of the lubricant feed nut 128.

The second annular lubricant container body 624 may have the same configuration as the first annular lubricant container body 622 so that the lubricant supply system 618 has two contactors 632. Alternatively, the second annular lubricant container body 624 may correspond at least substantially to the annular lubricant container body 122, 124 shown in FIG. 5.

It will be understood that the first annular lubricant container body 622 and integral contactor 632 can be used to form a standalone lubricant supply system without the need for a second reservoir portion such as the second annular lubricant container body 624. As an alternative to forming the integral contactor 632 by folding the second end region 649 of the elongate strip across the outer periphery and over the end of the first annular lubricant container body 622, the contactor may be formed by folding the first end region 647 of the elongate strip so that it extends across the through-hole 648 from the inner periphery of the annular lubricant container body. In examples in which the integral contactor is formed by folding the first end region 647 of the elongate strip, the first end region has a reduced width similar to, or the same as, the first end region 347 shown in FIG. 9.

Figure 13:
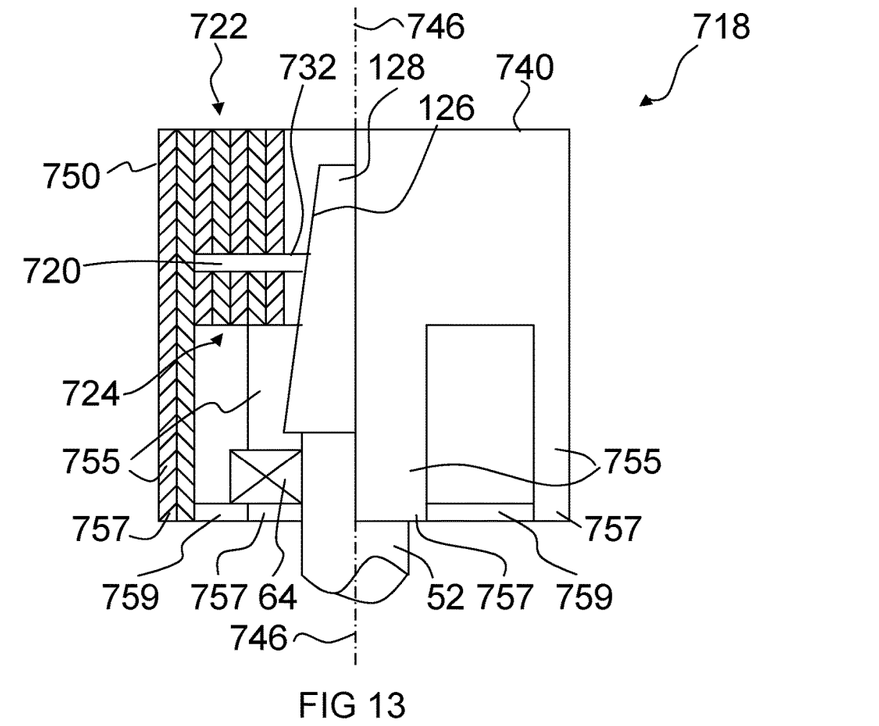
FIG. 13 is a schematic partially sectioned side view of a further alternative lubricant supply system.
Figure 14:
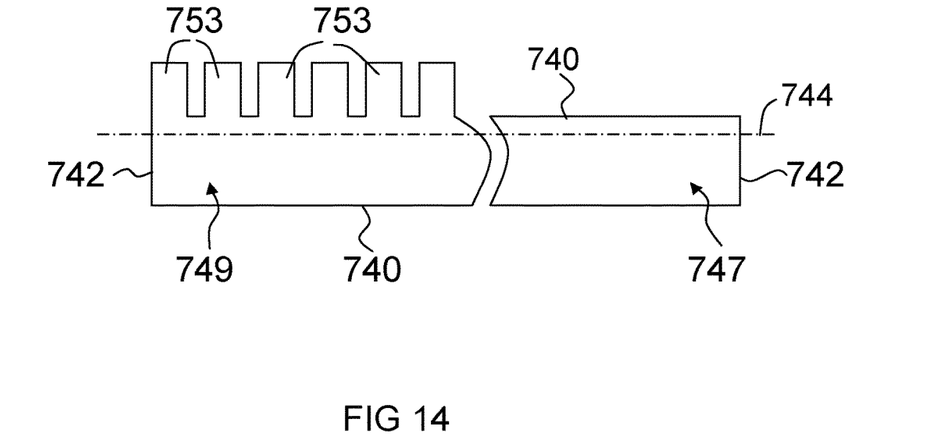
FIG. 14 shows an elongate strip from which an annular lubricant container body of the lubricant supply system of FIG. 13 can be formed.

FIGS. 13 and 14 illustrate another lubricant supply system 718 that may be used in the pump 50 instead of the lubricant supply system 118. However, as in FIG. 12 the lubricant supply system 718 is shown in an arrangement configured to supply lubricant to the tapered surface 126 of a lubricant transfer nut 128 provided on an end of a rotor shaft 52 of an inverted pump to lubricate a rolling bearing 64 that is disposed below the lubricant feed nut 128.

The lubricant supply system 718 comprises a lubricant reservoir 722, 724 and a wicking element 720 that comprises at least one contactor 732 configured to transfer lubricant from the lubricant reservoir to the tapered surface 126 of the lubricant feed nut 128. The lubricant reservoir comprises a first reservoir portion comprising a first annular lubricant container body 722 and a second reservoir portion comprising a second annular lubricant container body 724. The first and second annular lubricant container bodies 722, 724 are disposed opposite one another and the wicking element 720 is sandwiched between the two annular lubricant container bodies.

The wicking element 720 may at least substantially correspond to the wicking element 120 shown in FIG. 6 and the second annular lubricant container body 724 may at least substantially correspond to the annular lubricant container body shown in FIG. 5.

The first annular lubricant container body 722 is formed by winding an elongate strip comprising a porous material. As shown in FIG. 14, the elongate strip is axially asymmetric. The elongate strip has oppositely disposed lengthways extending edges 740 and respective ends 742 and is formed by cutting, or otherwise forming, a strip, or sheet, of the material to provide a rectangular main body portion with a plurality of projections 753 that project transversely of the longitudinal axis 744 of the strip. The projections 753 are arranged in spaced apart relation in the lengthways direction of the elongate strip as a series disposed at a second end region 749 of the elongate strip. When the elongate strip is wound about an axis 746 that extends transverse to the longitudinal axis 744, the first end region 747 of the strip forms a radially innermost portion of the first annular lubricant container body 722, the rectangular main body portion of the second end region 749 forms a radially outermost portion of the first annular lubricant container body including a circumferentially extending outer side wall 750 and the projections 753 form a series of elongate lubricant conveying members 755 that extend from the first annular lubricant container body to receive lubricant from the rolling bearing 64 and convey the received lubricant to the first annular lubricant container body. In the illustrated example, each lubricant conveying member 755 is defined by a plurality of projections 753. Thus, for example, a lubricant supply system 718 comprising four elongate lubricant conveying members 755 that each comprises three layers of the elongate strip would be formed from an elongate strip as shown in FIG. 14 that comprised a series of twelve projections 753.

In the illustrated example, the elongate strip shown in FIG. 14 is wound about the axis 746 to form an annular lubricant container body 722. The inner periphery of the first annular lubricant container body 722 defines a through-hole 748 configured to receive the lubricant feed nut 128 with clearance. The elongate lubricant conveying members 755 extend downwardly from the first annular lubricant container body 722 generally parallel to the longitudinal axis 746 of the through-hole 748.

The free ends 757 of the lubricant conveying members 755 are received in a lubricant collection receptacle 759 that is configured to collect lubricant that has been supplied to the rolling bearing 64 via the lubricant feed nut 128. The collection receptacle 759 may be defined by a portion of the pump housing or a separate component fitted into the pump housing. The collection receptacle 759 may comprise a circumferentially extending channel disposed adjacent and below the rolling bearing 64 so that lubricant can drip from the rolling bearing and collect in the receptacle from where it may be absorbed by the lubricant conveying members 755 and wicked back up to the first annular lubricant container 722. Some of the lubricant carried by the lubricant conveying members 755 may pass into the outer periphery of the second annular lubricant reservoir 724.

It will be understood that by suitably shaping the elongate strip from which the first annular lubricant container body 722 is made, it is possible to provide integral lubricant conveying members 755 to convey lubricant that has passed through the rolling bearing 64 back to the first annular lubricant container body 722 for resupply to the rolling bearing. Since the lubricant is primarily returned to the first annular lubricant container 722, the lubricant can then get to the wicking element 720 by gravity feed, rather than relying on wicking alone.

In a modification of the first annular lubricant container body 722, the first end region 747 may be provided with a reduced width portion as shown in FIG. 9 to provide an integral annular contactor 732 allowing the omission of the wicking element 720. In other examples, the second annular lubricant container body 724 may be provided with least one lubricant conveying member the same as, or similar to, the lubricant conveying members 755 or may be omitted so that there is just one annular lubricant container body. Optionally, both annular lubricant container bodies 722, 724 have at least one lubricant conveying member to convey lubricant received from a rolling bearing to the annular lubricant container body for resupply to the rolling bearing.

In the illustrated example, the series of projections 753 start at the end 742 of the second end region 749 of the elongate strip so that when the strip is wound, the lubricant conveying members 755 are disposed at the outer periphery of the first annular lubricant container body 722. In other examples, it may be desirable to locate the projections 753 intermediate the first and second end regions 747, 749 or starting at the free end of the first end region so that the lubricant conveying members 755 are disposed intermediate the inner and outer peripheries of the first annular lubricant container body 722 or the inner periphery respectively. Additionally, this provides the option of folding the end of the second end region 749 over the end of the first annular lubricant container body 722 to form an integral contactor the same as, or similar to, the integral contactor 632 shown in FIG. 12.

In the illustrated examples, the annular lubricant container bodies have a constant height, or thickness, in the axial direction of the body. In some examples it may be desirable to contour one or both ends of a lubricant container body in order to conform to other components in a pump. For example, by suitable trimming of a lengthways extending edge of the strip from which a lubricant container body is wound, it is possible to profile an end of the container body to complement the shape of a pump component to allow the container body to be fitted close to the component. This provides potential for valuable space saving within a pump body and the possibility of making smaller pumps.

Figure 15:
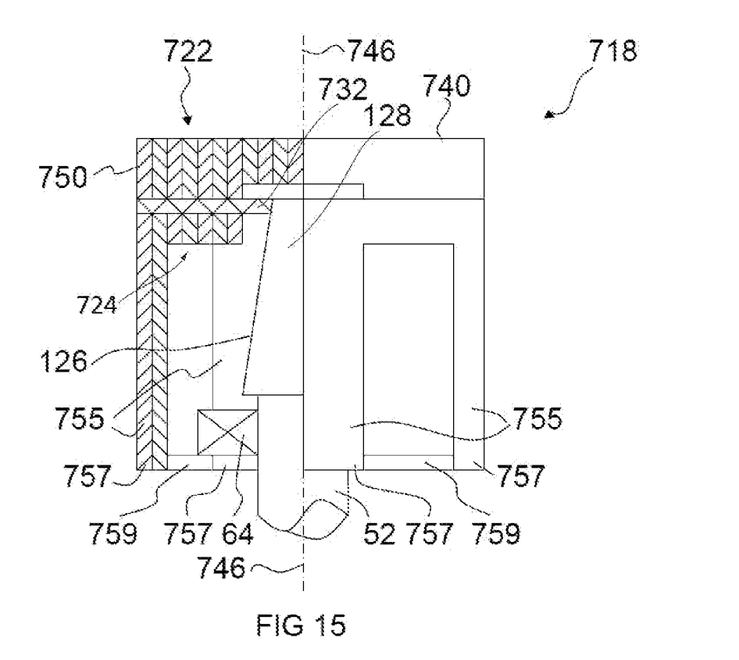
FIG. 15 is a schematic partially sectioned side view showing modifications to the lubricant supply system of FIG. 13.
Figure 16:
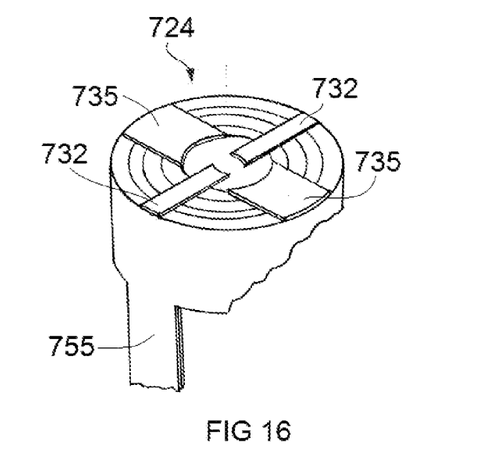
FIG. 16 is a schematic perspective view of a portion of a second lubricant container of the lubricant supply system of FIG. 15.

In the illustrated examples, the lubricant container bodies are annular lubricant container bodies with an axially extending through-hole defined by the inner periphery of the body. It is to be understood that in some examples, the lubricant supply system may comprise a substantially solid lubricant container body formed by winding an elongate strip. In such examples, there may be a small centrally disposed through-hole left following the removal of a winding mandrel or the like, but for practical purposes the lubricant container body may be considered a solid body. A solid lubricant container body will have a greater lubricant storage capacity than a correspondingly sized annular lubricant container body made from the same material(s). FIGS. 15 and 16 show modifications to the lubricant supply system 718 that include the incorporation of a solid lubricant container body with a profiled end.

Referring to FIG. 15, the first lubricant container body 722 is no longer an annular lubricant container body and the elongate lubricant conveying members 755 now extend from the second annular lubricant container body 724. Furthermore, there is no longer a separate wicking element. Instead the second annular lubricant container body 724 is wound from an elongate strip configured to provide at least one integral contactor 732.

The first lubricant container body 722 is wound from an elongate strip configured to provide a substantially solid body. In the illustrated example, the first lubricant container body 722 has been wound from an elongate strip provided with a cut-out extending partially along one lengthways extending edge from one end so that a centrally disposed recess is provided in one end of the lubricant container body to provide clearance above the free end of the lubricant feed nut 128.

Referring to FIG. 16, the second lubricant container body 724 is an annular body having a centrally disposed through-hole and has a plurality of elongate lubricant conveying members 755 extending from a lower (as viewed in the drawing) end of the lubricant container body. The second lubricant container body 724 may be formed using the elongate strip shown in FIG. 14, modified as described below. In the illustration, only one elongate lubricant conveying member 755 is shown. However, typically there will be a plurality of elongate lubricant conveying members disposed in spaced apart relating around the periphery of the second lubricant container body 724. These can be formed by providing the elongate strip with projections similar to, or the same as, the projections 753 shown in FIG. 14.

The second lubricant container body 724 has at least one integral contactor 732. In the illustrated example there are two integral contactors 732. The integral contactors 732 extend from the outer side wall 750 of the second lubricant container body 724 over an end of the lubricant container body and part of the way over the through-hole of the lubricant container body to engage the lubricant feed nut 128. The second lubricant container body 724 may additionally comprise at least end member 735 that extends from the outer side wall 750 of the second lubricant container body towards the centre, or longitudinal axis, of the lubricant container body. The end member(s) 735 may end at the inner periphery of the second lubricant container body and are not configured to engage the lubricant feed nut 128. The end members 735 may provide the second lubricant container body 724 with additional stiffness. The end member(s) 735 may be secured to the end of the second lubricant container 724 by means of a suitable adhesive such as a low temperature melting polymer. The elongate lubricant conveying members 755 extend from one end of the second lubricant container body 724, while the integral contactors 732 and end members 735 extend from the other end. Accordingly, the integral contactors 732 and end members 735 may be formed by providing suitably configured projections on the lengthways extending edge 740 of the elongate strip opposite the projection 753 and folding the projections over the second lubricant container body 724 so that they extend transverse to the longitudinal axis of the lubricant container body and lie against the end of the lubricant container body.

In other examples, the lubricant supply system 718 shown in FIGS. 15 and 16 may be modified to provide the first lubricant container 722 with at least one integral contactor the same as, or similar to, the integral contactors 732 or at least one end member the same as, or similar to, the end members 735. Optionally, in such examples, the second lubricant container 724 may be configured such that it does not have the integral contactors 732 or the side members 735.

By winding an elongate strip comprising a porous material to form a lubricant container body it is possible to obtain tighter tolerances on the body volume and height than are usually obtained using conventional methods of stacking layers of felt one upon another. The height of the lubricant container body can be set by simply changing the width of the of the elongate strip and a desired width can be obtained with greater accuracy by cutting a strip or sheet of material than by adding or subtracting layers of material from a stack. This improvement in the accuracy with which the lubricant container body can be formed makes it possible to obtain reductions in the overall height of the lubricant supply system, which may be desirable in designing pumps when space is limited.

Additionally, winding an elongate strip to form a lubricant container body allows the use of thinner materials, which are not practical for stacking. Thus innovative high performance felt materials, for example spunbound and meltblown felts with continuous fibres (no linting), enhanced lubricant wicking and lubricant absorption properties, may be used to provide lubricant supply systems with improved performance.

By suitable pre-forming of the elongate strip, a lubricant container body may be provided with an integral contactor configured to contact the pump lubricant transfer device to conduct lubricant from the lubricant container body to the lubricant transfer device. The integral contactor may be formed by shaping and winding an end portion of the elongate strip to form an annular integral contactor. In other examples, folding of the inner or outer end region of the elongate strip can provide an integral contactor that extends across the lubricant container body through-hole at an end of the lubricant container body. Additionally, or alternatively, lubricant container body can be provided with at least one lubricant conveying member that extends from the annular lubricant container body to receive lubricant from a rolling bearing and convey the received lubricant back to the lubricant container body for resupply to the rolling bearing.

In the illustrated examples, the lubricant bodies are shown as circular bodies. It is to be understood that this is not essential. A lubricant container body may be wound and fitted within a container, such as a cartridge 100, configured to provide the annular lubricant container body with a polygonal form.

The strip from which a lubricant container body may be wound may comprise a single layer of material. However, in some examples, the strip may be a composite formed by laying two different layers of material one above another. For example, a composite elongate strip may comprise a layer of a spunbound or meltblown material combined with a layer of polyester. It may, for example, be desirable to use a composite elongate strip to form a lubricant container body with an integral annular contactor as illustrated by, for example, FIGS. 3 and 4. The composite elongate strip may be configured such that only one of the layers extends to provide the first end region 347 from which forms the integral annular contactor.

In the illustrated example, the lubricant reservoir is fitted in a cartridge that is used to mount and align the lubricant reservoir and at least one contactor with the lubricant transfer device of the pump. In many examples, it may be desirable to supply the lubricant reservoir and at least one contactor in a body to form a unit that can be readily assembled into a pump. The body may be a cartridge, as illustrated, or another suitable mounting body such as a tube with internal projections configured to limit axial movement of the lubricant body. The cartridge or other body mounting may comprise one or more integral collection receptacles for collecting lubricant to be returned to the lubricant reservoir by a lubricant conveying member(s). It is to be understood that in other examples, the lubricant reservoir and at least one contactor may be assembled directly into the pump housing so that it is located by direct engagement with a part(s) of the pump housing.

The lubricant supply systems described above have been described with reference to a particular form of vacuum pump. However, this is purely by way of example and it is to be understood that such lubricant supply systems may be used in other types of vacuum pump. Furthermore, such lubricant supply systems may be used in pumps generally where the pump has bearings lubricated by a lubricant that is transferred from a lubricant reservoir to a lubricant transfer device, such as lubricant feed nut, that rotates on a rotor shaft.

It is to be understood that the examples shown in the drawings are schematic and that the thickness of the strips from which the lubricant container bodies are formed as been exaggerated for the purposes of clarity of representation. Similarly, there may be a significantly number of turns or layers used to form the lubricant container bodies.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A pump comprising:
   a housing;
   a rotor shaft supported by a bearing arrangement for rotation relative to said housing;
   a lubricant supply system; and
   a lubricant transfer device provided on said rotor shaft to transfer lubricant received from said lubricant supply system to a rolling bearing of said bearing arrangement,
   wherein said lubricant supply system comprises a lubricant reservoir and at least one contactor that engages said lubricant transfer device to transfer lubricant from said lubricant reservoir to said lubricant transfer device, and
   said lubricant reservoir comprises at least a first reservoir portion that comprises a first elongate strip comprising a porous material wound to define a first lubricant container body having a longitudinal axis that extends transverse to the longitudinal axis of said first elongate strip.

2. The pump as claimed in claim 1, wherein said lubricant reservoir comprises a second reservoir portion that comprises a second elongate strip comprising a porous material wound to define a second lubricant container body having a longitudinal axis that extends transverse to the longitudinal axis of said second elongate strip.

3. The pump as claimed in claim 1, wherein the lubricant container body is an annular lubricant container body defining a through-hole.

4. The pump as claimed in claim 3, wherein said through-hole is defined by an inner periphery of said elongate strip and said at least one contactor is defined by a portion of said inner periphery.

5. The pump as claimed in claim 3, wherein said at least one contactor comprises an extending element that extends at least partially across said through-hole and is defined by said first elongate strip.

6. The pump as claimed in claim 5, wherein said extending element is provided with an aperture configured to receive and engage a portion of said lubricant transfer device to transfer lubricant to said lubricant transfer device.

7. The pump as claimed in claim 5, where said extending element is defined by a portion of said first elongate strip that extends across an end face of said annular lubricant container body.

8. The pump as claimed in claim 1, wherein said at least one contact portion is defined by a wicking element disposed in flow communication with said lubricant reservoir to receive lubricant from said lubricant reservoir.

9. The pump as claimed in claim 1, wherein said first elongate strip defines at least one elongate lubricant conveying member extending from said first lubricant container body to receive lubricant from said rolling bearing and convey said received lubricant to said first lubricant container body.

10. The pump as claimed in claim 9, wherein said at least one elongate lubricant conveying member extends generally parallel to said longitudinal axis of the through-hole of the first lubricant container body.

11. The pump as claimed in claim 9, wherein said first lubricant container body is disposed above said rolling bearing and said at least one elongate lubricant conveying member extends downwardly from said first lubricant container body towards said rolling bearing.

12. The pump as claimed in claim 9, further comprising a lubricant collection receptacle configured to receive said lubricant from said rolling bearing, wherein a free end of said at least one lubricant conveying member is disposed in said lubricant collection receptacle.

13. A pump lubricant supply system comprising:
   a lubricant reservoir; and
   at least one contactor to engage a lubricant transfer device provided on a rotor shaft of a pump to transfer lubricant from said lubricant reservoir to said lubricant transfer device via said at least one contactor,
   wherein said lubricant reservoir comprises at least a first reservoir portion that comprises a first elongate strip of porous material wound to define a first lubricant container body having a longitudinal axis that extends transverse to the longitudinal axis of said first elongate strip.

14. The pump lubricant supply system as claimed in claim 13, wherein said first lubricant container body is an annular lubricant container body having an inner periphery that defines a through-hole.

15. A pump lubricant supply system as claimed in claim 13, further comprising a wicking element to be engaged with an end of said first lubricant container body to receive lubricant from said first lubricant container body, wherein said wicking element defines said at least one contactor.

16. The pump lubricant supply system as claimed in claim 14, wherein said at least one contactor is defined by a portion of said inner periphery.

17. The pump lubricant supply system as claimed in claim 14, wherein said at least one contactor comprises an extending element that extends at least partially across said through-hole.

18. The pump lubricant supply system as claimed in claim 17, wherein said projecting element is defined by said elongate strip.

19. The pump lubricant supply system as claimed in claim 18, wherein said extending element is defined by a portion of said elongate strip that extends across an end face of said first lubricant container body.

20. The pump lubricant supply system as claimed in claim 18, wherein said extending element is provided with an aperture configured for insertion of at least a portion of said lubricant transfer device.

21. The pump lubricant supply system as claimed in claim 13, wherein said elongate strip defines at least one lubricant conveying member extending from said first lubricant container body to receive lubricant from said rolling bearing and convey said received lubricant to said first lubricant container body.

22. The pump lubricant supply system as claimed in claim 21, wherein said at least one lubricant receiving member is an elongate member that extends from an end of said first lubricant container body.

23. The pump lubricant supply system as claimed in claim 22, wherein said at least one lubricant conveying member extends generally parallel to said longitudinal axis of said first lubricant container body.

24. The pump lubricant supply system as claimed in claim 21, further comprising a lubricant collection receptacle for collecting lubricant from said rolling bearing and receiving a free end of said at least one lubricant conveying member.

25. The pump lubricant supply system as claimed in claim 13, wherein said first elongate strip is configured such than an end of said first lubricant container body defines a recess.

26. A method of manufacturing a pump lubricant supply system that comprises a lubricant reservoir and at least one contactor to engage a lubricant transfer device provided on a rotor shaft of a pump to transfer lubricant from said lubricant reservoir to said lubricant transfer device via said at least one contactor, said method comprising forming at least a first reservoir portion of said lubricant reservoir by winding an elongate strip comprising a porous material to define a first lubricant container body having a longitudinal axis that extends transverse to the longitudinal axis of said elongate strip.

27. The method of a manufacturing a pump lubricant supply system as claimed in claim 26, further comprising forming said first lubricant container body as an annular container body having an inner periphery that defines a through-hole.

28. The method of manufacturing a pump lubricant supply system as claimed in claim 27, further comprising configuring at least a portion of said inner periphery to define said at least one contactor.

29. The method of manufacturing a pump lubricant supply system as claimed in claim 27, further comprising configuring a first end of said elongate strip to extend from said inner periphery at least partially across said through-hole to define said at least one contactor.

30. The method of manufacturing a pump lubricant supply system as claimed in claim 27, further comprising configuring a first end region of said elongate strip to extend from an outer periphery of said annular lubricant container body at least partially across said through-hole to define said at least one contactor.

31. The method of manufacturing a pump lubricant supply system as claimed in claim 29, further comprising providing said at least one contactor with an aperture for insertion of at least a portion of said lubricant transfer device.

32. The method of manufacturing a pump lubricant supply system in claim 27, further comprising forming a first end of said elongate strip with a reduced width portion and winding said elongate strip such that said reduced width portion forms an aperture disposed in said through-hole which aperture defines said at least one contactor.

33. The method of manufacturing a pump lubricant supply system as claimed in claim 26, further comprising providing a wicking element to engage an end of said annular lubricant body and configuring said wicking element to define said at least one contactor.

34. The method of manufacturing a pump lubricant supply system as claimed in claim 26, further comprising forming said elongate strip as an axially asymmetric strip.

35. The method of manufacturing a pump lubricant supply system as claimed in claim 34, wherein a lengthways extending edge of said elongate strip is profiled such that the first lubricant container body has an end face provided with a recess configured to receive a part of said pump.

36. The method of manufacturing a pump lubricant supply system as claimed in claim 34, further comprising forming said elongate strip such that a lengthways extending edge of the elongate strip is provided with a plurality of projections extending transversely of said longitudinal axis of the elongate strip and winding the elongate strip such that said projections form at least one lubricant conveying member extending from said lubricant container body to receive lubricant from a rolling bearing supplied with lubricant by said lubricant transfer device.

37. The method of manufacturing a pump lubricant supply system as claimed in claim 36, wherein said at least one lubricant conveying member is an elongate member extending from an end of said lubricant container body.

38. The method of manufacturing a pump lubricant supply system as claimed in claim 36, further comprising forming said plurality of projections and winding said elongate strip such that said projections form a plurality of circumferentially spaced apart lubricant conveying members.

* * * * *